(12) United States Patent
Klein et al.

(10) Patent No.: US 8,407,599 B1
(45) Date of Patent: Mar. 26, 2013

(54) ADDRESS BOOK EXTENSION

(75) Inventors: David Evan Klein, Oakton, VA (US);
Brian Coughlin, Reston, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 675 days.

(21) Appl. No.: 12/363,313

(22) Filed: Jan. 30, 2009

(51) Int. Cl.
*G06F 3/00* (2006.01)
*G06F 3/01* (2006.01)

(52) U.S. Cl. ........ 715/739; 715/733; 715/738; 715/748; 715/843

(58) Field of Classification Search .................. 715/716, 715/748, 843, 733, 738, 739; 710/30; 725/37
See application file for complete search history.

(56) References Cited

U.S. PATENT DOCUMENTS

| | | | | |
|---|---|---|---|---|
| 4,969,097 A * | 11/1990 | Levin | ............................ | 715/234 |
| 5,724,457 A * | 3/1998 | Fukushima | .................... | 382/311 |
| 5,805,159 A * | 9/1998 | Bertram et al. | ............... | 715/764 |
| 5,864,340 A * | 1/1999 | Bertram et al. | ............... | 715/780 |
| 5,959,629 A * | 9/1999 | Masui | ........................... | 715/808 |
| 6,002,390 A * | 12/1999 | Masui | ........................... | 345/173 |
| 6,337,698 B1 * | 1/2002 | Keely et al. | .................... | 715/823 |
| 6,983,280 B2 * | 1/2006 | Cheung et al. | ........................ | 1/1 |
| 7,096,232 B2 * | 8/2006 | Doss et al. | ............................. | 1/1 |
| 7,171,353 B2 * | 1/2007 | Trower et al. | ..................... | 704/9 |
| 7,194,404 B1 * | 3/2007 | Babst et al. | ........................ | 704/9 |
| 7,802,191 B2 * | 9/2010 | Pettinati et al. | ............... | 715/739 |
| 2002/0024506 A1 * | 2/2002 | Flack et al. | .................... | 345/169 |
| 2002/0052900 A1 * | 5/2002 | Freeman | ........................ | 707/531 |
| 2002/0156864 A1 * | 10/2002 | Kniest | ............................ | 709/217 |
| 2005/0223308 A1 * | 10/2005 | Gunn et al. | .................... | 715/500 |
| 2005/0283364 A1 * | 12/2005 | Longe et al. | .................... | 704/257 |
| 2006/0020904 A1 * | 1/2006 | Aaltonen et al. | ............... | 715/850 |
| 2006/0026521 A1 * | 2/2006 | Hotelling et al. | ............. | 715/702 |
| 2006/0026535 A1 * | 2/2006 | Hotelling et al. | ............. | 715/863 |
| 2006/0026536 A1 * | 2/2006 | Hotelling et al. | ............. | 715/863 |
| 2006/0095842 A1 * | 5/2006 | Lehto | ............................ | 715/532 |
| 2006/0161870 A1 * | 7/2006 | Hotelling et al. | ............. | 715/863 |
| 2006/0161871 A1 * | 7/2006 | Hotelling et al. | ............. | 715/863 |
| 2006/0265648 A1 * | 11/2006 | Rainisto et al. | ............... | 715/534 |
| 2006/0274051 A1 * | 12/2006 | Longe et al. | .................... | 345/173 |
| 2008/0307306 A1 * | 12/2008 | Pettinati et al. | ............... | 715/711 |

\* cited by examiner

*Primary Examiner* — Nicholas Augustine

(57) ABSTRACT

Methods, media, and systems are provided for presenting potential matches for address book entries across multiple online applications. Interaction between a web site provider, telecommunications network provider, and third-party data sources enable presentation of an input form that can be utilized across applications for a number of different types of information. Potential matches are automatically displayed based on the information provided in an application-independent user-input form. The retrieval of data is for any type of information that may be applicable to the particular software application for which the retrieval is taking place. Computer-readable media and systems are provided for performing methods of presenting potential matches in address book information across a plurality of internet software applications. Computer-readable media for performing methods of facilitating requests for information from one or more user address book databases are also provided.

18 Claims, 4 Drawing Sheets

ADDRESS BOOK EXTENSION

SUMMARY

The present invention is defined by the claims below, but summarily, embodiments of the present invention provide for methods, media, and systems for presenting potential matches for address book entries across multiple online applications. Rather than create a specific address book application and enhance its capabilities, the present invention provides for more transparent use and functions in accessing third-party address books. This is accomplished through interaction between a telecommunications network provider, a web site provider, and third-party data sources of contact information. An input form is presented that can be utilized across applications for a number of different types of information. When a user begins entering a name, potential matches are automatically displayed based on the information already provided. While this entry is for a person's name, the lookup is for any type of information that may be applicable to the particular software application for which the lookup is taking place. The contact name is the simplest example. However, other examples include, but are not limited to, returning locations for map-oriented applications, a user name for a particular social networking web site, or instant messenger handle for a messaging application.

In a first aspect, computer-readable media are provided for performing a method of presenting potential matches in address book information across a plurality of internet software applications. The method comprises presenting on a display device an application-independent online user-input form. User input is received that indicates at least a portion of a name. That user input is communicated to a server on the telecommunications network. Based on the user input, a request is communicated from the server to a database that stores contact information associated with a plurality of people. The user input is utilized to retrieve one or more possible matching entries from the contact information. Indications of the one or more possible matching entries are returned and presented by way of the user-input form.

In a second aspect, computer-readable media are provided for performing a method of facilitating requests for information from one or more user address book databases. The method comprises receiving, at a server on a telecommunications network, a user input from an application-independent input form presented on a web site. The user input contains at least a portion of a name. Based on the user input, a request is communicated from the server to a third-party database containing user address book information. Potential matches are received from the third-party database. Indications of potential matches are communicated to the application-independent input form.

In a third aspect, a system is provided for the presentation of potential matches to address book entries across a number of internet software services. The system comprises a set of one or more service-side application programming interfaces (APIs), at least one server serving a web site that utilizes client APIs, and at least one data source containing address book information for a plurality of people. The set of service-side APIs reside on a server provided by a telecommunications provider. The set is configured to receive requests from client APIs at web sites, request address book database information from a third-party address database based on the requests received, and communicate potential matches from the address book database information to the client APIs. The client APIs present an input form to users, automatically request address book information, without user intervention, and present indications of potential matches from the third-party address database to the user.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
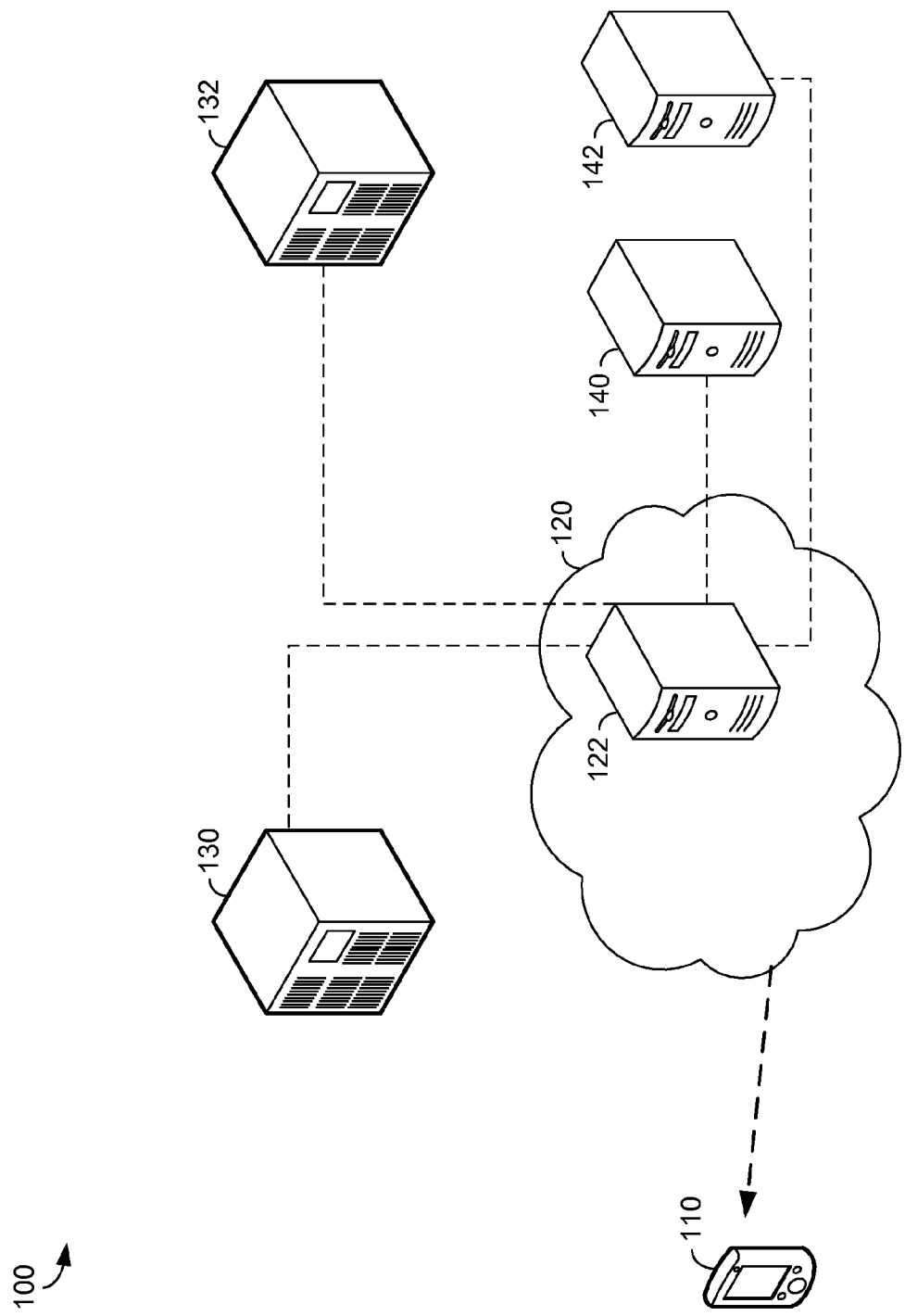
FIG. 1 depicts an exemplary environment suitable for practicing embodiments of the present invention.

Embodiments of the present invention provide systems, media, and methods for presenting potential matches for address book entries across multiple online applications. Users of online contact databases often would like to consolidate all of the information they have into a single collection of information. In order to do so, absent the present invention, it is often necessary to utilize a specially created address book application. While these specifically designed "universal" address book applications can be enhanced to include a wide variety of capabilities, they lack the transparency and ease of use that native address books provide. Embodiments of the present invention can mimic this transparency across web applications through interaction between the telecommunications network provider, the web site provider, and third-party data sources of contact information.

One way this can be accomplished is with the use of an input form presented to the user, known as an Address Book Extender (ABE). When a user begins entering a name, potential matches are automatically displayed based on the information already provided. Unlike present address lookups, which only pass the partial name information to a single application, the ABE uses versatile application programming interfaces (APIs). This allows the telecommunications network provider and the web site provider greater flexibility. Entry of a person's name can create a lookup for any type of information depending on the parameters requested and the given software application for which the lookup is taking place. Returning the contact name is the simplest example. However, other examples include, but are not limited to, a short messaging service (SMS) contact number for web-to-SMS applications, a user name for a web site, or instant messenger handle for an instant messaging application.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ABE | Address Book Extension |
| AJAX | Asynchronous JavaScript and Extensible Markup Language |
| API | Application Programming Interface |
| ASP | Active Server Pages |
| GPS | Global Positioning Satellite |
| IP | Internet Protocol |
| PHP | Personal Home Pages |
| PIM | Personal Information Management |
| SMS | Short Messaging Service |
| UML | Unified Modeling Language |
| XML | Extensible Markup Language |
| WOEID | Where on Earth Identifier-+ |

Further, various technical terms are used throughout this description. An illustrative resource that fleshes out various aspects of these terms can be found in *Newton's Telecom Dictionary* by H. Newton, 22$^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

When utilizing online applications, users typically are given a number of input forms that may automatically be filled with information based on the user's contacts or previous use. As an example, when an auto-fill occurs for an electronic mail application, as the user begins to type in the "to" field, a potential recipient's name or e-mail address is populated in that particular input form. Often times, a number of close approximations are given. Thus, if a user wants to address an e-mail to "John Smith," then after entering "Joh" or "Jo" the e-mail application will begin to try correctly guessing to whom the e-mail should be addressed. Any contact or previous e-mail recipient may be used, all beginning with "Jo" or "Joh." The more information the user provides, the closer the e-mail application is able to approximate to whom the e-mail should be addressed, until the user selects the correct recipient or is finished typing. However, these are application-specific address books. When these specific address books are utilized, users are limited in the number of contacts that may be accessed, as well as the ways in which the automatic fill process occurs.

If the address lookup process is decoupled from the specific application, other difficulties can arise. When a user is using a specific application online, such as an e-mail application, the user does not want to have to access a separate program to look up an e-mail address. However, many decoupled address books require the user to access a different application altogether to retrieve the contact information. From a user experience standpoint, a better solution is integration between the address book application and the application that is in use. Thus, transparency helps improve the user's experience and makes the address book more intuitive to use. In this way, the user experiences only the application, while the background address book goes unnoticed.

The media, systems, and methods of embodiments of the address book extender (ABE) involve the interaction of four entities: a user, a web site provider, a telecommunications network provider, and a data source. In accordance with the embodiments of the present invention, the interaction of these four parties can be implemented in a way to provide flexibility to each party involved. The user does not notice the ABE during execution because the input form that is utilized appears to operate just as the application would otherwise. The data source also sees no difference as its database is only exposed to the web site provider and network provider, but no differently than normal.

The ABE is a user-input form that is presented while a user interacts with a web application, regardless of the partnered application in use. As an example, a general purpose web portal and search web site could have e-mail, instant messaging, search, and mapping capabilities. In a static sense, any input from the web site could return a person's name from an address book. On the other hand, the auto-completion of information with ABE is based on the portion of the web site being used, or more specifically the web application being used. When a user is in the e-mail application of the site, the auto-fill is for the contact's e-mail address. At another time, when the user is taking advantage of that site's instant messaging application, the contact's instant messaging handle may be used, if different. At still another time, using the site's mapping capabilities could return the person's home or work address on the map when the user begins to type that contact's name. In this way, the embodiments of the ABE are well-suited to bridge the various applications available at such multipurpose sites.

Greater capability is demonstrated when the varied applications that a user executes are served at different web sites. For example, if web-to-short-messaging-service (SMS), physical location mapping, and e-mail applications are each from different sites, the user would need to keep three separate address books up-to-date. If a single internet-accessible data source is available to provide an SMS number, physical address information, and an e-mail address, without user intervention, then the user experience is enhanced. Embodiments of the ABE allow the user to begin typing in an input form in any one of these applications. The input form is provided by the telecommunications network provider in a way that can easily be modified to utilize multiple arguments, so that the extender can retrieve the necessary information from a data source. Of course, the ABE is also extensible in the sense that a plurality of data sources may be accessed in order to retrieve possible matches.

As can be understood from this transparency for the user and data source, many features of the ABE are implemented through the media, methods, and systems of the telecommunications network provider and the web site provider. One aspect of the ABE is a set of interfaces that reside on the web site provider's servers. These interfaces present an input form to the user and may be referred to as client-side APIs. In many respects the forms presented by these APIs are application-independent, meaning that the particular application using them is not of vital importance. Of course, this is the case only to the extent that the application must accept the arguments communicated by the input form, such as a text string in the case of a contact name or a numeric entry for a phone number. In the embodiments set forth above and below, the input form accepts a name of a contact. It is within the spirit and scope of the present invention to accept other arguments as well, including a user name, a phone number, an SMS number, a fax number, and an e-mail address, among others.

Another aspect of the ABE is a set of interfaces that reside on one or more servers provided by the telecommunications network provider. These interfaces work in concert with the client-side APIs and may be referred to as service-side APIs. The set of interfaces at the telecommunications network provider server receive input that the user has entered and send requests to locate potential matches in the user's address book(s). While the data source sees no difference in the requests from the service-side APIs, these APIs on the network provider's servers return information based on the requests made to them. In other words, the service-side APIs request information specifically based on the information necessary for the application. For example, if the client-side API is for a web-to-SMS messaging application, the interfaces of the ABE residing on the telecommunications network server will request the SMS number associated with a record and return that piece of information.

In this manner, the service-side APIs could be thought of as a "pivot point" between web sites and data sources. The telecommunications provider is able to partner with specific data sources. General portal web sites, search sites, and the like that provide multiple services to their users, provide contact information that is likely to be in-depth and useful. In turn, partner web sites can leverage the availability of this data through the telecommunications provider. There are advantages to this model pointed out above and below, but one aspect of the scheme in general is the added value for the user when the telecommunications network provider is partnered with a number of web sites and data sources.

As mentioned previously, both sets of interfaces associated with the ABE allow for greater flexibility for the telecommunications network provider while enhancing the user experience. In certain embodiments of the present invention, the network provider is able to develop the needed client-side APIs as well as the service-side APIs. This ensures compatibility of the interacting interfaces. At the same time, changes needed by the client-side APIs are minor and may be easily undertaken by the web site provider. The changes made are for the arguments requested and returned. For example, a social networking site may want a username returned for its auto-filling input form, while the site for an SMS web application will want the SMS number returned. Rather than develop an entirely new API, the web site provider can use a template-styled API that the network provider supplies, changing only the parameter returned. In the case above, changing the return of a username to an SMS number is the only difference.

Along the same lines, this provides extensibility for a web site provider, as what is requested and returned is easily changed if necessary. The social networking site that requested usernames could suddenly see a marked increase in an application requiring the instant messenger handle of that site. If that handle happens to be different than the user name, the site providers would only need change the argument that is requested and returned from the username to the instant messenger handle. This requires no change on the part of the telecommunications provider APIs, which simply receive and facilitate the request in the same manner with a different argument.

In the figures and succeeding descriptions, like numbering will be used where possible. FIG. 1 will now be described, which depicts an exemplary environment 100 that may be utilized to implement embodiments of the present invention. Environment 100 should be understood to be of simplified form, and that other components not pictured may, and likely will, reside on the described networks. Such elements as routers, repeaters, hubs, gateways, servers, and other standard telecommunications network elements will be known to persons of ordinary skill in the art as typically in use on networks. Such elements are not shown here so as not to obscure the embodiments of the present invention.

A device 110 is shown that is presenting a browsed internet web site via a session on a telecommunications network 120. Embodiments of the invention contemplate wired and wireless sessions, although the figure specifically shows a wireless device. Device 110 can be one of a myriad of devices when embodiments of the present invention are implemented. While device 110 can be a computing device such as a desktop computer or laptop, it will be described here as a web-enabled mobile device that may be more readily used for the myriad tasks available at a web site. Such a device would include capabilities for one or more tasks that typical mobile devices execute, like placing telephone calls, communicating SMS messages, and performing mobile global positioning satellite (GPS) and mapping utilities.

Device 110 is shown as coupled to network 120 via a dotted line to denote that device 110 and network 120 may have other elements in between, such as base transceiver stations, antennae, gateways, repeaters, and similar equipment. Other elements coupled in a like fashion will be shown with dotted lines. There is no requirement that the described embodiments of the present invention communicate wirelessly, however, as they can also perform these functions via a wired connection.

Telecommunications network 120 is a network capable of providing internet access, such as to a web server 130 and a web server 132. While the aforementioned elements used in a network and those like them are not depicted, a server 122 is shown and labeled. It may be the case that the function of server 122 is actually carried out by a plurality of servers. This can be a dedicated server or plurality of servers with the sole function to carry out these interfaces. Likewise, server 122 can be one or more servers that execute multiple tasks. The number and configuration of servers on network 120 is not limiting on the scope of the present invention. Within the contemplated scope is the configuration of server 122 for providing the set of service-side APIs described above and below.

In practice, like server 122, web server 130 may be a plurality of servers used by a web site provider. Web server 130 is configured in such a way as for users to access the web content the provider makes available. At least a portion of that content is web applications requiring user input, such as e-mail, messaging, and other similar applications. Again, the types of applications available on the web site are not limiting on the scope of the present invention, nor is the other content available at the web site. Web server 130 is also configured to execute a set of client-side APIs as described above and below. Again, because the configuration is not contemplated within the scope of the embodiments of the present invention, whether the two functions are carried out by the same physical server is not of consequence. There could be one server or a group of servers within a plurality dedicated to the execution of the set of client-side APIs. Web server 132 may be a similar or differently configured web server allowing access to a different web site. Web server 132 is depicted here to show that more than one web site provider can utilize the methods, media, and systems of the embodiments of the present invention at the same time.

Continuing with reference to FIG. 1, data sources 140 and 142 are shown that contain contact information for one or more people. The embodiments of the present invention do not contemplate a particular type of data source. Rather, this could be any data source that contains contact information for people such as names, physical addresses, e-mail addresses, telephone numbers, fax numbers, mobile device numbers, user names, instant messenger handles, web addresses, business affiliations, and any other sort of information generally associated with a contact list. This list is intended to be illustrative and there are other sorts of data that may be stored within the data source that falls within the scope of the present invention. Data source 140 could be one or more storage elements containing contact information for a general services portal, a search engine using user-profiled searches, or any other third-party source, separate from the telecommunications provider, utilizing contact information. As mentioned with regard to web server 132 above, data source 142 can be a similar or different data source as data source 140. Data source 142 is provided, once again, to show that a plurality of different sources are contemplated by the embodiments of the invention at any one given time.

As outlined above, one aspect of the embodiments of the present invention is the computer-readable media that perform methods of presenting potential matches in address book information across a plurality of internet software applications. The method comprises presenting on a display device an application-independent online user-input form. This may be a user-input form that appears as a dialogue or pop-up box. The user-input form may also be placed over the usual location of the user-input form of the application if the embodiments of the present invention were not to be used. There is not a specific shape, color, size, or configuration of such an input form that is necessary, as the specific form of the display should not be construed as limiting the scope of the present invention. Once the input form has been presented, user input is received that indicates at least a portion of a name. Again, other implementations of the present invention could use entry of data other than names, but it will used in these examples due to its intuitive nature.

The user input entered into the user-input form is communicated to a server on the telecommunications network. As outlined above, a plurality of servers may be used. Based on the user input, i.e., the portion of the name that has been entered, a request is communicated from the server to a third-party database that stores contact information associated with a plurality of people. This again can be a database associated with a general services portal web site, a search engine and applications web site, or any other web site that provides an address book that a user could consider his or her "primary" address book. The user input is utilized to retrieve one or more possible matching entries from the contact information. This is the database-agnostic request that the address book data source sees as similar to any other request for an argument. For example, the request could look like the request from the same site for which the data store is normally the contact address book.

Once at least one possible matching entry is identified, indications of the possible matching entries are returned to the telecommunications server. The telecommunications server passes that information back to the client-side APIs, and the indications are presented by way of the user-input form. Presentation can be above, below, or to the side of the form in use, or can be displayed elsewhere in the user interface. The location of the user-input form and results should not be construed as limiting the scope of the present invention.

Figure 2:
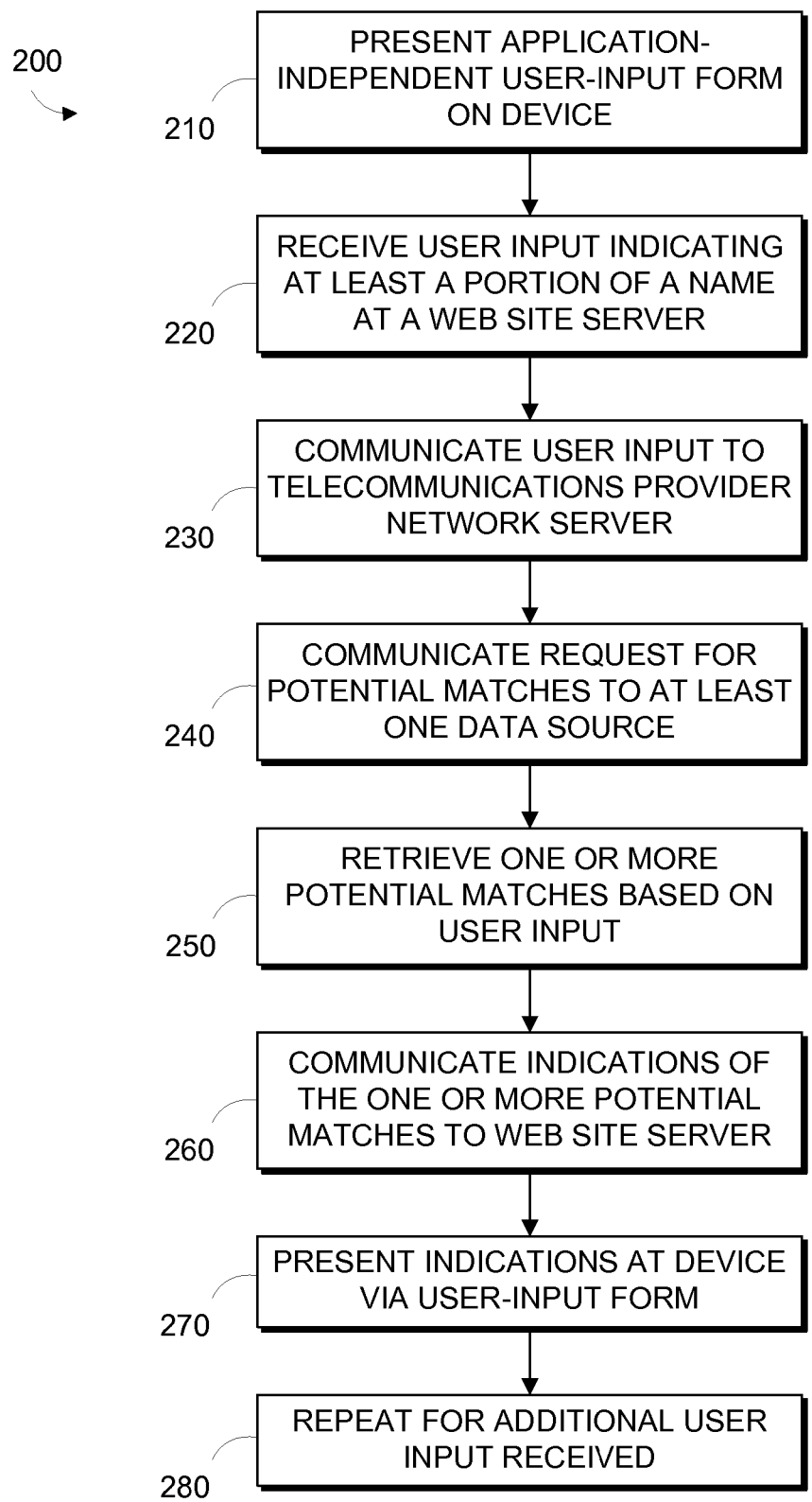
FIG. 2 is a flowchart representing a method of presenting potential address book matches according to embodiments of the present invention.

Turning now to FIG. 2, a flowchart is shown representing a method 200 of presenting potential address book matches according to embodiments of the present invention. Where applicable, reference will be made to environment 100 and the exemplary elements as described above in FIG. 1 as they relate to the described method. At a step 210, an application-independent online user-input form is presented on a display device. This could be device 110 as described above, or a substantially similar device. Again for the purposes of this disclosure, the device utilized will be a wireless device with web-browsing capabilities, in addition to other functionality. Part of that functionality includes the ability to receive input through a keyboard, touch screen, or other entry means. User input that indicates at least a portion of a name is received at the web site server 132 at a step 220 via the available input entry means.

At a step 230, the user input is communicated to a server, such as server 122 on the telecommunications network 120. Again, the type of connection is not limiting in nature on the scope of the present invention, nor is the protocol used for communicating the user input. Communicating the user input to server 122 on the telecommunications network could use a well-known protocol, such as Internet Protocol (IP) in one of its various versions. However, there are a number of other protocols that could be utilized.

Based on the user input, at a step 240 a request is communicated from server 122 to a database that stores contact information associated with a plurality of people. The database can be data source 140 or one substantially similar. In certain embodiments, database 140 is a relational database organized according to contact names and associated information with those names. In other embodiments, database 140 could be arranged according to a different "primary" segment of information, such as telephone number or e-mail address rather than the contact's name. The particular protocols and formats of the request at step 240 can also take on a variety of implementations. This request will be sent on a "real-time" basis, communicating the user input or a portion thereof as it is received. Database 140 can also be a plurality of databases that are either utilized commonly by a single data source provider, or can be multiple data sources through multiple providers.

As mentioned previously, the request to the data source 140 utilizes a parameter for returning the one or more potential matching entries based on a selection of the parameter by a provider of the web site. In certain embodiments, the selection of the parameter is based on an action being performed in response to the user input. Thus, the parameter communicated when the user-input form is utilized to prepare an e-mail would be different than the parameter communicated when the user-input form is communicating information during the preparation of an SMS message. The parameter selected is within the control of the web site provider as that provider will ultimately implement the necessary interfaces to send and receive information regarding the action being carried out.

At a step 250, the user input is utilized to retrieve one or more possible matching entries from the contact information stored at database 140. This portion of the process can return a predetermined number of potentially matching entries. For example, the three nearest entries could be returned regardless of how close those entries are to the user input Likewise, this can return entries that are within a certain range of overlapping information, such as the first three letters of the entries matching the first three letters of the user input.

Indications of the one or more possible matching entries are returned to server 132 via server 122 at a step 260. As described above, these indications can be the contact name with the information necessary to present the potential matches above, below, or beside the user-input form in some manner. Indications can include other data, such as the telephone number, SMS number, or e-mail address. Other embodiments contemplate communicating only the pertinent information to the action being performed, i.e., the SMS number of a contact to whom a message is being sent.

At a step 270, the same user-input form is utilized to present the indications to the user. There are a variety of ways described above that the device can present the potential matches on its display. Once again, this presentation can be transparent to the user, as the auto-fill presentation shown to the user can appear much the same as if the application's native address book or contact list were queried for an automatic fill. The entire process can be repeated at a step 280 when additional user input is received, increasing the accuracy of the approximation by providing more of the contact name.

Embodiments of the present invention contemplate that the requests to the data source include one or more segments of data to authenticate a user's identity. In certain embodiments, the segments of data are communicated from web server 132 to server 122 on the telecommunications provider network, where they are stored for a predetermined amount of time. In other embodiments, the segments of data are communicated only in order to initially retrieve information and are not stored for future lookups. The manner of authenticating the user to the data source in order to retrieve the contact information from the proper record can vary. A one-time login could be used, or a separate login associated with the provider could be established.

Figure 3:
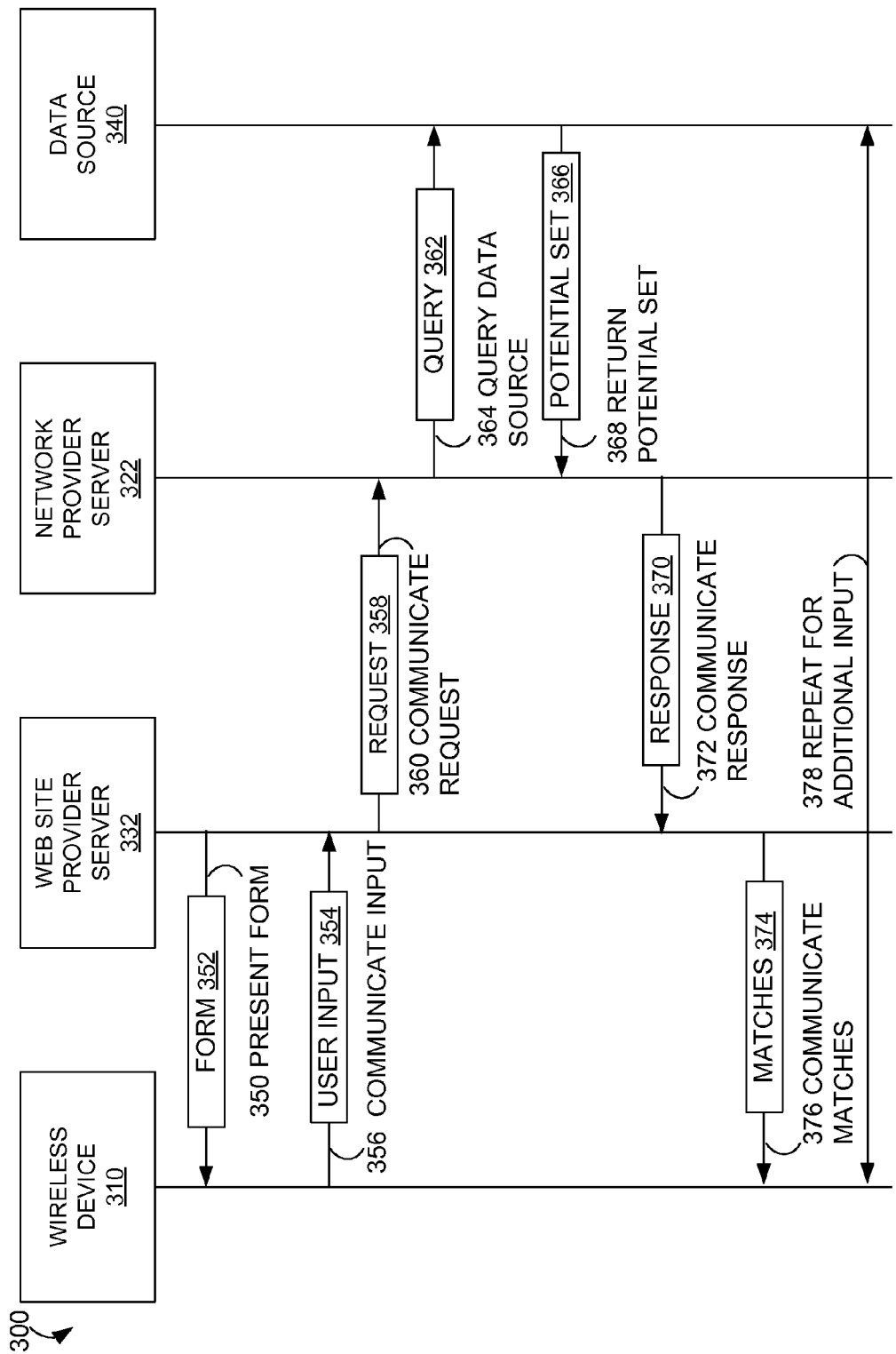
FIG. 3 is a diagram depicting the flow of segments of information between a requesting device and a data source.

FIG. 3 shows a diagram representing an environment 300 in which segments of information flow between a client device, a server at a partnered web site, a server on the telecommunications network, and a third-party data source. Again, these are elements that can be similar to those seen and described in the above figures. The final two digits of reference numerals will be the same as like elements where applicable. Each element is shown in the singular so as not to obscure aspects of the invention or inadvertently connote necessary configurations, but all could be pluralized. The flow of data to and from the server on the telecommunications network and to and from the web site server is made possible through two sets of interfaces, one residing on each server.

A device 310, a telecommunications provider server 322, a web site server 332 and a data source 340 are shown corresponding to previously described elements or to otherwise substantially similar elements to those above. A first exchange contemplated within the scope of some embodiments of the present invention is a step 350 of presenting of a user-input form 352 so that it can be displayed on device 310. This is shown by the communication of the data representing user-input form 352 as it is sent from web site server 332 to device 310. User input 354 is communicated from device 310 to web site server 332 to begin executing an action with respect to a web-based application.

Web site server 332 sends at least a portion of user input 354 to server 322 as a request 358 communicated at step 360 via the network of the telecommunications provider. It has been shown as request 358 to denote the possibility that all input is not sent, or that additional information may be sent with it. However, it does not limit the present invention to a transformation of user input 354, as user input 354 may be the only data needed to communicate request 358.

Telecommunications provider network server 322 in turn sends a query 362 to data source 340 at a step 364. Again, query 362 need not be transformative of request 358, but it may be. Query 362 communicates data in order to query data source 340 for potential matches to the user input received at web site provider server 332. At a step 368, a set of potential matches 366 is sent from data source 340 to server 322, passing the set back to the requesting APIs. Server 322 communicates response 370 to server web site server 332 at a step 372. Again, response 370 could very similarly, if not identically, resemble set 366. A set of potential matches 374 is presented on device 310 at step 376 to give the user one or more possible auto-fill options. A step 378 is shown that each of the above steps can be repeated when additional input is received to narrow down the list of potential matches.

The coding and execution of the above described requests and responses should not be limited to a particular protocol or standard. Likewise, the specifics regarding the physical elements utilized or information passed from element to element should not constrain the scope of the present invention. The ABE could be implemented with a programming language such as asynchronous JavaScript and XML (AJAX), but need not be. Other scripting languages such as Perl, Personal Home Pages (PHP), or Active Server Pages (ASP) could be used.

Figure 4:
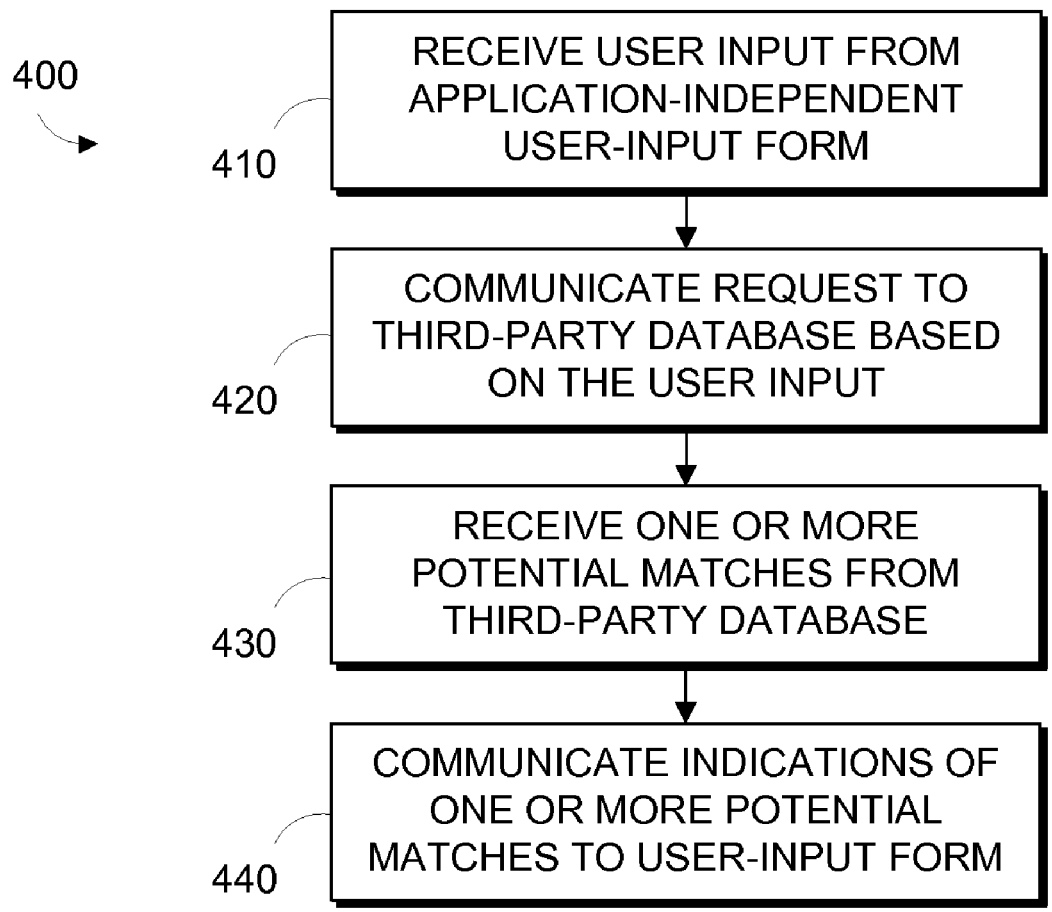
FIG. 4 is a flowchart representing a method of facilitating requests for contact information from one or more address book databases.

Looking at FIG. 4, a method 400 of facilitating requests for information from one or more address book databases is represented by a flowchart. As shown and described above, a server 122 on a telecommunications provider network is utilized to facilitate requests as provided below. In this way, server 122 is configured to act as a pivot point between partner web sites and partner data sources. The number of web sites and data sources should not be construed as limiting in nature upon the scope of the present invention. Rather, server 122 can be configured to process requests and responses from a single web site and a single data source, or for a plurality of each. Server 122 can be a plurality of servers or an individual network element.

At a step 410, server 122 on telecommunications network 120 receives a user input from an application-independent input form presented on a web site. In certain embodiments this user input contains at least a portion of a contact name. Other embodiments could pivot around different data such as an instant messenger name, an e-mail address, or variety of contact numbers (telephone, SMS, fax, etc.). The input form is application-independent to the extent it can be used with a variety of web applications, such as e-mail, instant messaging, web-to-SMS applications, and the like.

At a step 420, based on the user input, a request is communicated from server 122 to a third-party database 142 containing user address book information. This user address book information is similar to that described above. The request can be one similar to that shown in FIG. 3 as query 362. Because the method of facilitating requests is agnostic with respect to the third-party database, the specific implementation of the request is not limiting with respect to the scope of the present invention.

One or more potential matches from third-party database 142 are received by server 122 at a step 430. The set of matches may be similar in nature to the data in potential set 366. At a step 440, indications of the one or more potential matches to the application-independent input form are communicated to device 110 via web site provider server 132.

As described above, this method repeats as additional user input is received or until the user completes the action for which the user-input form is provided. In this way, additional or, more likely, fewer potential matches will be presented as more input is provided. This is a real-time operation, updating the potential list as the user is inputting a name into the interactive form. As the user inputs additional letters of the name, the precision of the potential matches improves to return a more confidant list of options.

In certain embodiments the user-input form is developed by a provider of the telecommunications network to supply to a provider of the web site. In this way, a uniform "template" is possible such that the web site provider needs only to modify the specific arguments supplied and called for in return. This serves multiple purposes. Among them, the telecommunications provider is more assured that the interface the web provider utilizes on its end will be suitable for the interface utilized on the network provider's end. It also makes the partnership and implementation more attractive for the web provider, as there is minimal work on that party's part to develop the needed API. These and other advantages will become readily apparent to one of skill in the art.

In embodiments of the present invention, potential matches requested by the server are requested dynamically based on an action being performed at the web site. These can be potential matches requested by the server utilizing at least one parameter selected from a contact name, a phone number, a fax number, an e-mail address, a user name, and an instant messenger name. In providing information to the device, the one or more potential matches communicated to the input form include at least one segment of information selected from a contact name, a phone number, a fax number, an e-mail address, a user name, and an instant messenger name. This allows for specificity in the requests and responses utilized.

In yet other embodiments, the server requests potential matches utilizing a format independent of the one or more third-party databases. Database 140 or those similar need not be capable of anything above and beyond their usual configurations and capabilities. It is the configurations of the servers utilized by the web site provider and telecommunications network provider that affect the requests made. However, database 140 does not need to change and will receive requests from server 122 as it would from any other server. In this respect, the ABE extends the capability of the web site and the network without any fundamental need to improve the intelligence of the database. It is the flexibility of the interfaces used that actually allows multiple data sources to partner with the telecommunications network provider. Thus, a plurality of databases with less intelligent logic can be transformed into a "smarter" database thanks to the telecommunications network provider.

Because the foregoing disclosure of the embodiments of the present invention explains the flexibility of such systems, methods, and media, it also should be understood that the telecommunications provider can implement the interfaces to be browser application agnostic. Any browser application that is commonly used for viewing internet pages should be compatible with the interfaces and forms used. Likewise, a particular programming language is not required.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of presenting potential matches in address book information across a plurality of internet software applications being served by an internet-accessible web server, the method comprising:

the web server serving one of the applications to a user, wherein the user is coupled to the web server through a telecommunications provider network;

in response to user interaction with the served application, the web server sending to a user display device via the telecommunications provider network an application-independent online user-input form defined in a client-side API on the web server;

the client-side API of the web server receiving user input entered into the user-input form that indicates at least a portion of a name;

communicating the user input from the client side API on the web server to a service-side API stored on a network server in the telecommunications provider network, wherein the service-side API and the client-side API are application-independent and are configured to interface with one another;

based on the user input, the service-side API communicating a request from the network server to a database that stores contact information associated with a plurality of people;

the database utilizing said user input to retrieve one or more possible matching entries from said contact information;

sending the one or more possible matching entries from the database to the service-side API in the network server;

returning indications of said one or more possible matching entries from the network server to the web server via the service-side API and the client-side API; and by way of said user-input form, the served application sending said indications to the user display device.

2. The method of claim 1 further comprising repeating the receiving the communicating the user input, the communicating the request, the utilizing, the returning and the sending said indications steps as additional user input is entered.

3. The method of claim 2, wherein the contact information includes a contact name and at least one of a phone number, a fax number, an e-mail address, a user name, and an instant messenger name.

4. The method of claim 3, wherein the request to the database utilizes a parameter for returning the one or more potential matching entries based on a selection of the parameter by the client-side API.

5. The method of claim 4, wherein the selection of the parameter is based on an action being performed in response to the user input.

6. The method of claim 5, wherein communicating a request to the database includes communicating one or more segments of data to authenticate a user's identity.

7. The method of claim 6, wherein the segments of data are communicated from the web server to the telecommunications network server.

8. The method of claim 7, wherein the segments of data are stored on the telecommunications network server for a predetermined amount of time.

9. A system for the presentation of potential matches to address book entries across a number of internet software services, the system comprising:

a telecommunications provider network for coupling a user device to one or more web sites;

a telecommunications network server including a set of one or more service-side application programming interfaces (API) configured to
 (1) receive requests from client APIs at at least one of the web sites;
 (2) request address book database information from a third-party address database based on the requests received; and
 (3) communicate potential matches from the address book database information to the client APIs;

an internet-accessible web server serving a web site as an internet software application that utilizes one of the client APIs to
 (1) present an input form to the user device via the telecommunications provider network in response to user interaction with the served application;
 (2) automatically send requests for address book information to the service-side API, without user intervention;
 (3) receive indications of potential matches from the service-side API that were obtained from the third-party address database; and
 (4) send from the internet software application the received indications of potential matches to the user device via the telecommunications provider network;

at least one data source containing the third-party address database coupled to the telecommunications network server.

10. The system of claim 9, wherein the set is configured to access address book database information utilizing one or more parameters selected by the client APIs.

11. The system of claim 10, wherein the client APIs communicate one or more segments of user authentication information.

12. The system of claim 11, wherein the at least one server is configured to store the one or more segments of user authentication information for subsequent requests from client APIs.

13. The system of claim 12, wherein the at least one server is configured to store the one or more segments of user authentication information for a predetermined period of time.

14. A system for the presentation of potential matches to address book entries across a number of internet software services, the system comprising:

a telecommunications provider network for coupling a mobile user device to one or more web sites, wherein the telecommunications provider network includes a plurality of base transceiver stations, and wherein the mobile user device is capable of placing telephone calls via the telecommunications provider network;

a telecommunications network server including a set of one or more service-side application programming interfaces (API) configured to
 (1) receive requests from client APIs at at least one of the web sites;
 (2) request address book database information from a third-party address database based on the requests received; and
 (3) communicate potential matches from the address book database information to the client APIs;

an internet-accessible web server serving a web site as an internet software application that utilizes one of the client APIs to
 (1) present an input form to the user device via the telecommunications provider network in response to user interaction with the served application;
 (2) automatically send requests for address book information to the service-side API, without user intervention;
 (3) receive indications of potential matches from the service-side API that were obtained from the third-party address database; and
 (4) send from the internet software application the received indications of potential matches to the user device via the telecommunications provider network;

at least one data source containing the third-party address database coupled to the telecommunications network server.

15. The system of claim 14, wherein the set is configured to access address book database information utilizing one or more parameters selected by the client APIs.

16. The system of claim 15, wherein the client APIs communicate one or more segments of user authentication information.

17. The system of claim 16, wherein the at least one server is configured to store the one or more segments of user authentication information for subsequent requests from client APIs.

18. The system of claim 17, wherein the at least one server is configured to store the one or more segments of user authentication information for a predetermined period of time.

* * * * *